(12) United States Patent
Wiegmann et al.

(10) Patent No.: US 10,336,040 B2
(45) Date of Patent: Jul. 2, 2019

(54) METHOD FOR MANUFACTURING A COMPOSITE ELEMENT FOR VACUUM INSULATION ELEMENTS

(71) Applicant: BASF SE, Ludwigshafen (DE)

(72) Inventors: Werner Wiegmann, Rahden-Wehe (DE); Marc Fricke, Osnabrueck (DE); Joerg Krogmann, Lohne (DE)

(73) Assignee: BASF SE, Ludwigshafen (DE)

( * ) Notice: Subject to any disclaimer, the term of this patent is extended or adjusted under 35 U.S.C. 154(b) by 269 days.

(21) Appl. No.: 15/514,759

(22) PCT Filed: Sep. 22, 2015

(86) PCT No.: PCT/EP2015/071670
§ 371 (c)(1),
(2) Date: Mar. 27, 2017

(87) PCT Pub. No.: WO2016/046172
PCT Pub. Date: Mar. 31, 2016

(65) Prior Publication Data
US 2017/0210102 A1    Jul. 27, 2017

(30) Foreign Application Priority Data
Sep. 25, 2014 (EP) .................................. 14186310

(51) Int. Cl.
| | |
|---|---|
| *B32B 27/00* | (2006.01) |
| *B32B 5/00* | (2006.01) |
| *B32B 37/00* | (2006.01) |
| *B29C 63/00* | (2006.01) |
| *E04B 1/00* | (2006.01) |
| *F16L 59/00* | (2006.01) |
| *B32B 27/06* | (2006.01) |
| *B32B 37/04* | (2006.01) |
| *F16L 59/065* | (2006.01) |
| *B29C 63/02* | (2006.01) |
| *E04B 1/80* | (2006.01) |
| *B29C 63/04* | (2006.01) |
| *B32B 5/18* | (2006.01) |

(Continued)

(52) U.S. Cl.
CPC ........ *B32B 27/065* (2013.01); *B29C 63/0052* (2013.01); *B29C 63/0065* (2013.01); *B29C 63/0091* (2013.01); *B29C 63/02* (2013.01); *B29C 63/04* (2013.01); *B32B 5/18* (2013.01); *B32B 27/36* (2013.01); *B32B 37/04* (2013.01); *B32B 37/06* (2013.01); *E04B 1/803* (2013.01); *F16L 59/065* (2013.01); *B29K 2667/00* (2013.01); *B29K 2675/00* (2013.01); *B29K 2995/0015* (2013.01); *B29K 2995/0067* (2013.01); *B29L 2007/002* (2013.01); *B32B 2037/0092* (2013.01); *B32B 2250/24* (2013.01); *B32B 2255/10* (2013.01); *B32B 2255/205* (2013.01); *B32B 2266/0278* (2013.01); *B32B 2266/08* (2013.01); *B32B 2266/126* (2016.11); *B32B 2266/128* (2016.11); *B32B 2305/02* (2013.01); *B32B 2305/022* (2013.01); *B32B 2307/304* (2013.01); *B32B 2307/7242* (2013.01); *B32B 2367/00* (2013.01); *B32B 2375/00* (2013.01); *B32B 2607/00* (2013.01); *Y02A 30/242* (2018.01); *Y02B 80/12* (2013.01)

(58) Field of Classification Search
CPC ....... B32B 27/00; B32B 27/06; B32B 27/065; B32B 27/30; B32B 27/36; B32B 5/00; B32B 5/10; B32B 5/18; B32B 37/00; B32B 37/04; B32B 37/06; B29C 63/00; B29C 63/005; B29C 63/0052; B29C 63/006; B29C 63/0065; B29C 63/009; B29C 63/0091; B29C 63/02; B29C 63/04; E04B 1/00; E04B 1/80; E04B 1/803; F16L 59/00; F16L 59/06; F16L 59/065
See application file for complete search history.

(56) References Cited

U.S. PATENT DOCUMENTS

2014/0335314 A1* 11/2014 Aldino .................. F16L 59/065
428/159

FOREIGN PATENT DOCUMENTS

| CA | 2 693 186 A1 | 8/2011 | |
|---|---|---|---|
| CA | 2693186 A1 * | 8/2011 | ............... B32B 5/18 |

(Continued)

OTHER PUBLICATIONS

International Preliminary Report on Patentability dated Mar. 30, 2017 in PCT/EP2015/071670 (with English language translation).

(Continued)

*Primary Examiner* — Jacob T Minskey
*Assistant Examiner* — Matthew Hoover
(74) *Attorney, Agent, or Firm* — Oblon, McClelland, Maier & Neustadt, L.L.P.

(57) ABSTRACT

The present invention relates to a method for manufacturing a composite element comprising a single- or multi-part core and an envelope which are in a force fit combination with each other, at least comprising providing a single- or multi-part core of an evacuable organic material; at least partly enveloping the core with an envelope to obtain a composite element precursor; and treating the composite element precursor for a period leading to an at least partial softening of the evacuable organic material and of the envelope surface apposing the core. The present invention further relates to composite elements obtained or obtainable by a method of the present invention and also to the method of using a composite element of the present invention as a vacuum insulation panel or as a thermal insulation material.

15 Claims, No Drawings

(51) Int. Cl.
    *B32B 27/36*     (2006.01)
    *B32B 37/06*     (2006.01)
    *B29K 667/00*     (2006.01)
    *B29K 675/00*     (2006.01)
    *B29L 7/00*     (2006.01)

(56) References Cited

FOREIGN PATENT DOCUMENTS

| | | |
|---|---|---|
| DE | 100 59 453 A1 | 6/2002 |
| EP | 2 072 548 A2 | 6/2009 |
| WO | 2011/069959 A2 | 6/2011 |
| WO | 2012/059388 A1 | 5/2012 |
| WO | 2012/119892 A1 | 9/2012 |
| WO | 2014/048778 A1 | 4/2014 |

OTHER PUBLICATIONS

"Joint Industry Foam Standards and Guideline", Polyurethane Foam Association, Total 5 Pages, (Aug. 2014).
International Search Report dated Apr. 19, 2016 in PCT/EP2015/071670 Filed Sep. 22, 2015.

\* cited by examiner

METHOD FOR MANUFACTURING A COMPOSITE ELEMENT FOR VACUUM INSULATION ELEMENTS

The present invention relates to a method for manufacturing a composite element comprising a single- or multi-part core and an envelope which are in a force fit combination with each other, at least comprising providing a single- or multi-part core of an evacuable organic material; at least partly enveloping the core with an envelope to obtain a composite element precursor wherein the envelope surface apposing the core consists of a thermoplastic material; and treating the composite element precursor for a period leading to an at least partial softening of the evacuable organic material and of the envelope surface apposing the core. The present invention further relates to composite elements obtained or obtainable by a method of the present invention and also to the method of using a composite element of the present invention as a vacuum insulation panel or as a thermal insulation material.

Composite elements combining a core and an envelope are in principle known from the prior art for use as insulation elements. Specifically evacuated composite systems are employed as insulation material and so are known as vacuum insulation panels.

Composite elements, such as vacuum insulation panels, are increasingly being used for thermal insulation. Their applications include refrigerator cabinets, containers for cold storage vehicles, coolboxes, cooling cells or district heating pipes. Owing to their comparatively low thermal conductivity, they offer advantages over conventional insulants. Their energy saving potential over closed-cell rigid polyurethane foams thus typically amounts to a factor of 3 to 7. Such vacuum insulation panels invariably consist of a thermally insulating core material, for example of pressed or loose fumed silica, precipitated silica, open-cell rigid polyurethane (PU) foam, open-cell extruded polystyrene foam, silica gels, glass fibers, beds of loose polymer particles, pressed regrind from rigid or semi-rigid PU foam, perlite packed into a gastight foil, evacuated and sealed in airtight. The vacuum is typically less than 100 mbar. At this vacuum, a thermal conductivity of below 10 mW/m*K is attainable for the panels depending on core material structure and pore size.

Core materials used are, in particular, compressed powder sheets of fumed silica and glass fiber sheets. Useful core materials further include xerogels and rigid foams, which have a certain stability and are conformable to the particular shape required. Polyurethane or polyisocyanurate foams are frequently used, as are aerogels which provide a good thermal insulating effect even in the unevacuated state.

The stability of the envelope is a problem as well as the mechanical stability of the composite systems. The vacuum disappears once the envelope incurs mechanical damage. The composite element thus loses mechanical stability, particularly in the case of core materials in fumed silica and glass fibers, and declines in thermal insulation performance.

To address this problem, the composite elements are constructed using adhesive layers for example. This leads to a bond forming between the foil and the foam, so minor damage to the envelope will not result in a loss of the vacuum across the full composite element.

WO 2012/119892 A1 discloses composite elements comprising a core in a foamed or porous material, preferably a foamed material, a covering layer applied to the core and a thermoplastic polymer foil other than the covering layer. The use of such composite elements in the manufacture of refrigerating equipment is likewise disclosed.

DE 100 59 453 for example also describes a composite element combining core material and foil in vacuum insulation panels. DE 100 59 453 discloses the use of an adhesive to bond an open-cell rigid foam to the foil.

But the use of adhesives or of additional covering layers leads to a more burdensome manufacturing process. Simply enveloping the previously produced core material followed by evacuation/sealing is not possible in the manufacturing process. Construction has to proceed layer by layer and so is cost intensive.

It is an object of the present invention to provide stable composite elements and simplified methods for manufacture thereof. It is a further object of the present invention to provide efficiently insulating composite elements and simplified methods for manufacture thereof.

We have found that this object is achieved by a method for manufacturing a composite element comprising a single- or multi-part core and an envelope which are in a force fit combination with each other, at least comprising the steps of:
  (i) providing a single- or multi-part core of an evacuable organic material;
  (ii) at least partly enveloping the core with an envelope to obtain a composite element precursor wherein the envelope surface apposing the core consists of a thermoplastic material;
  (iii) treating the composite element precursor for a period leading to an at least partial softening of the evacuable organic material and of the envelope surface apposing the core.

It was found that, surprisingly, the method of the present invention provides a force fit bond between the envelope and the core of the composite element. This accordingly provides a simple way to manufacture composite elements which by virtue of the bond of the envelope to the core have an enhanced level of mechanical stability and, specifically in the event that the composite element is evacuated and the envelope is closed, provide a more stable vacuum. These composite elements are notable in that in the event of any damage, the envelope does not delaminate from the core, thus ensuring that some structural integrity is maintained.

A composite element precursor is to be understood in the context of the present invention as meaning a combination comprising, at least, the single- or multi-part core and the envelope with the proviso that there is no durable bond between the core and the envelope.

The method of the present invention provides, initially, a single- or multi-part core of an evacuable organic material and then a step (ii) of at least partly enveloping the core with an envelope to obtain a composite element precursor. It is possible in accordance with the present invention for only one surface of the core to be covered. But it is similarly also possible for the core to be in an essentially completely enveloped state with the proviso that the envelope surrounding the composite element precursor obtained as per step (ii) has not been closed. According to the invention, the envelope surface apposing the core consists of a thermoplastic material. In this regard, the present invention allows for the possibility that the envelope consists completely of a thermoplastic material. However, it is similarly possible in the context of the present invention for the envelope to consist of two or more layers and for only the layer which forms the envelope surface apposing the core to consist of a thermoplastic material.

According to the present invention, the layer which forms the envelope surface apposing the core has a thickness of not less than 30 µm, preferably a thickness of not less than 40 µm and more preferably a thickness of not less than 50 µm.

Preferably, the single- or multi-part core has one or more essentially planar surfaces, so the envelope apposes the core closely.

The composite element precursor obtained as per step (ii) is then treated as per step (iii) such that the envelope surface apposing the core and the evacuable organic material will soften partially at least. In the process, a bond develops according to the present invention between the core material and the envelope surface apposing the core. A composite element obtained after the treatment features a force fit bond between the envelope and the single- or multi-part core.

The present invention allows in principle any treatments that lead to an at least partial softening of the evacuable organic material and of the envelope surface apposing the core. Useful treatments include, for example treatments that lead to some heating and some associated softening of the evacuable organic material and of the envelope surface apposing the core.

According to the present invention, the envelope surface apposing the core consists of a thermoplastic material. In a further preferred embodiment of the present invention, the envelope consists of a foil, particularly of a foil where at least one surface of the foil consists of a thermoplastic material.

According to the present invention, the envelope surface, which consists of a thermoplastic material, apposes the core. Thus, in the context of the present invention, no further layers or adhesives are employed between the core and the envelope.

Any suitable heat sources known to a person skilled in the art are in principle usable in the context of the present invention, in particular those which lead to uniform heating of the envelope and of the core. The application of heat may preferably involve a hotplate, a hotlamp (IR radiator) or ultrasound.

The present invention accordingly also provides, in a further embodiment, a method as described above wherein the treatment comprises a heat treatment via heating, infrared or ultrasound.

The envelope preferably apposes the core closely in order to ensure a uniform bond between the core and the envelope. The present invention here allows the envelope being brought into contact with the core by suitable measures, for example by tautening the envelope or pressing the envelope on. Suitable devices for tautening or pressing the envelope on are known per se to a person skilled in the art. When the core has an essentially planar surface, pressing on may be effected using a plate for example.

Accordingly, in a further embodiment, the present invention also provides a method as described above wherein the treatment as per step (iii) comprises a heat treatment and pressing the envelope against the core.

The pressure involved in any pressing on is required by the present invention to be adjusted to the material used. Suitable pressures range for example from 1 to 5 bar, for example from 1.25 bar to 4 bar, preferably 1.5 bar to 3 bar and more preferably from 1.75 bar to 2 bar.

It is also possible according to the present invention for two or more sides/surfaces of the core to be force-fittingly connected to the envelope. In one possibility, for example, the core is fully covered with the envelope and the method of the present invention provides a force fit bond between the core and the envelope.

The method of the present invention may include further steps. The core material in order to achieve an improved thermal insulation performance is advantageous for example, depending on the evacuable organic material used as core.

In a possible embodiment of the method according to the invention, for example, the method may comprise a step of evacuating the evacuable organic material. For this purpose it is advantageous first to essentially completely enclose the single- or multi-part core with the envelope, which can then be evacuated. An advantage for this is, for example, for the envelope to be closed on two or more sides and to have only one open side, which can then be utilized to apply the vacuum. When the single- or multi-part core has a plate-shaped configuration, for example, the envelope may be configured in the form of a double-ply sheath closed on three sides with the single- or multi-part core being introduced through the open side. The method of the present invention may thus, for example after step (ii) and before step (iii), comprise a step of evacuating and a subsequent step of closing the envelope.

Accordingly, in a further embodiment, the present invention also provides a method as described above wherein the method after step (ii) and before step (iii) comprises steps (a) and (b):
(a) evacuating the composite element precursor;
(b) closing the envelope to obtain an evacuated composite element precursor.

In one embodiment, therefore, the present invention provides a method for manufacturing a composite element comprising a single- or multi-part core and an envelope which are in a force fit combination with each other, at least comprising the steps of:
(i) providing a single- or multi-part core of an evacuable organic material;
(ii) at least partly enveloping the core with an envelope to obtain a composite element precursor wherein the envelope surface apposing the core consists of a thermoplastic material;
(a) evacuating the composite element precursor;
(b) closing the envelope to obtain an evacuated composite element precursor;
(iii) treating the composite element precursor for a period leading to an at least partial softening of the evacuable organic material and of the envelope surface apposing the core.

The duration of the treatment as per step (iii) may vary between wide limits as long as the evacuable organic material and the envelope surface apposing the core are ensured to soften at least partially. A suitable treatment has for example a duration in the range from 2 seconds to 30 minutes, preferably in the range from 10 seconds to 10 minutes and more preferably in the range from 30 seconds to 1 minute.

Accordingly, in a further embodiment, the present invention also provides a method as described above wherein the treatment is carried out for a period in the range from 2 seconds to 30 minutes.

In principle, the composite element obtained according to the present invention may have any desired shape. This shape is in essence predetermined by the shape of the core. In a preferred embodiment, the present invention provides a method for manufacturing plate-shaped composite elements. Accordingly, the core preferably has a plate-shaped configuration.

Accordingly, in a further embodiment, the present invention also provides a method as described above wherein the single- or multi-part core has a plate-shaped configuration.

A shaped article used as core may typically have a thickness in the range from 5 to 40 mm for example.

The core in the present invention consists of an evacuable organic material. Of particular suitability are materials which are typically used as thermal insulation materials, i.e., materials which as such already have an efficient thermal insulation performance. Suitable materials include, for example, rigid organic foams or organic xerogels and organic aerogels. Evacuable rigid organic foams include, for example, those based on polyurethanes or polyisocyanurates. Preference for use as rigid organic foam in the present invention is given to open-cell rigid organic foams, particularly those based on polyurethanes or polyisocyanurates.

It is also possible to use, for example, organic aerogels and organic xerogels, which have an essentially uninterrupted surface, i.e., a skin. Materials of this type are efficiently processable in the method of the present invention to obtain an efficient bond between the envelope and the core.

Accordingly, in a further embodiment, the present invention also provides a method as described above wherein the evacuable organic material is selected from the group consisting of organic aerogels, organic xerogels and rigid organic foams. The evacuable organic material is more preferably selected from the group consisting of organic aerogels, organic xerogels and open-cell rigid polyurethane foams.

In a further embodiment of the present invention, the evacuable organic material is an organic xerogel.

Organic aerogels, organic xerogels and rigid organic foams suitable for the purposes of the present invention are particularly those which are employable as insulation material. A person skilled in the art has in-principle knowledge of suitable materials. Suitable aerogels include for example those disclosed in WO 2012/059388 A1 and WO 2014/048778 A1. Particularly suitable organic xerogels are disclosed for example in WO 2011/069959 A2 or WO 2012/059388 A1. Suitable rigid organic foams are disclosed in EP 2072548 A2 for example.

According to the present invention, the envelope surface apposing the core consists of a thermoplastic material. In a further preferred embodiment of the present invention, the envelope is a foil.

Customary envelopes for vacuum composite elements are usable in particular. The envelope preferably has a multilayered construction which ensures that a force fit bond of the envelope to the core material is possible, and is capable of providing a permanent vacuum. The preference in the present invention is thus for a diffusiontight envelope.

Diffusiontight envelopes are usable in the context of the present invention provided that at least one of the envelope surfaces consists of a thermoplastic material and this surface is brought into contact with the core.

In a further embodiment, the envelope is not diffusiontight. An envelope of this type is specifically suitable for applications not requiring a high thermal insulating effect, or for composite elements which have an adequate thermal insulation effect by virtue of the core, as for example when an aerogel is employed as core material.

Foils useful as an envelope are for example known by the term "barrier foils". Particularly suitable foils for the purposes of the present invention are specifically air impermeable or gas diffusiontight. In a further embodiment, the envelope has a gas permeability of less than 1 $cm^3/(m^2d)$ and/or a water vapor permeability of less than 1 $g/(m^2d)$, the volume data being based on 1 bar pressure and room temperature. Unless otherwise stated, the gas permeability is determined in accordance with DIN 53380.

The present invention, in a further embodiment, further also provides a method as described above wherein the envelope is diffusiontight. According to the present invention in a further embodiment, the envelope has a DIN 53380 gas permeability of less than 1 $cm^3/(m^2d)$.

In a further embodiment of the present invention, the envelope has a DIN 53380 water vapor permeability of less than 1 $g/(m^2d)$.

Finally, in a further embodiment, the present invention provides a method as described above wherein the envelope has a DIN 53380 gas permeability of less than 1 $cm^3/(m^2d)$ and a DIN 53380 water vapor permeability of less than 1 $g/(m^2d)$.

The present invention, in a further embodiment, further also provides a method as described above wherein the envelope has a multilayered construction.

According to the present invention, it is also possible for the envelope to consist of two or more plies or else layers, preferably at least one of which is diffusiontight. The envelope may for example be two ply or three ply. According to the present invention, the envelope may be for example a multi-ply foil.

Metal foils or else polymeric foils are useful as envelope in the present invention for example. Metal foil is to be understood in the context of the present invention as meaning a multilayered foil that includes a metal layer and at least one layer of a thermoplastic material. A very wide variety of polymeric foils are usable provided at least one of the surfaces of the foil consists of a thermoplastic material and this surface is brought into contact with the core.

In an embodiment, therefore, the present invention provides a method for manufacturing a composite element as described above wherein the envelope comprises a polymeric foil or a metal foil. In a further embodiment, the present invention also provides a method for manufacturing a composite element as described above wherein the envelope comprises a diffusiontight polymeric foil or a metal foil. Polyethylene and polyethylene terephthalate are examples of suitable materials.

According to the present invention, the envelope has at least one surface consisting of a thermoplastic material, for example polyethylene or polypropylene. In the context of the present invention, the surface which consists of a thermoplastic material apposes the core.

Accordingly, in a further embodiment, the present invention also provides a method as described above wherein the envelope surface apposing the core consists of a thermoplastic material selected from the group consisting of polyethylene and polypropylene. The envelope surface apposing the core preferably consists of polyethylene.

A preferred envelope for the purposes of the present invention consists, for example, of two or more layers, for example of one polyester ply and one polyethylene ply, while one or more layers may, for example, also have a vapor-deposited metallic layer. Vapor-deposited aluminum layers are suitable for example. According to the present invention, at least one surface of the envelope consists of a thermoplastic material. Accordingly, the surface layer is preferably a polyethylene layer. The envelope here may also consist of three or more layers, in which case for example two or more polyester layers are also combinable, for example one polyester layer with a vapor deposited metal and one polyester layer without vapor deposition. Polyterephthalate layers are suitable for example.

Useful envelopes for the purposes of the present invention include, for example, commercially available barrier foils such as the foil available from Hanita Coatings RCA Ltd under the designation V08621. This foil consists, for example, of three plies of aluminum-metallized polyterephthalate film and an LLDPE seal layer.

According to the present invention, the envelope may also comprise further layers, including for example polyamide layers, ethylene-vinyl alcohol copolymer layers or combinations thereof.

According to the present invention, the envelope may be constructed as a combination of individual foils. Foils useful as envelope and methods for manufacture thereof are known per se to a person skilled in the art.

The composite elements obtained according to the present invention have a force fit bond between the envelope and the core material. In this context, the present invention allows for the possibility that the envelope covers only part of the core. In this case, the core has not been evacuated and the envelope serves essentially to improve mechanical stability. It is similarly possible, however, for the core to be completely enclosed by the envelope and for the composite element to have been evacuated.

The strength of the force fit bond of the envelope to the core may be measured similarly to DIN EN ISO 5271 for example. According to the present invention, the envelope surface apposing the core is in direct contact with the evacuable organic material and adheres to the evacuable organic material with a force ranging from 100 to 300 N, determined similarly to DIN EN ISO 5271.

In a further aspect, the present invention also provides the composite elements as such and also their use as thermal insulation material.

Accordingly, in a further aspect, the present invention also provides a composite element obtained or obtainable by a method as described above.

More particularly, in a further aspect, the present invention also provides a composite element comprising a single- or multi-part core of an evacuable organic material and at least one closed envelope enclosing the core, wherein the envelope surface apposing the core is in direct contact with the evacuable organic material and adheres to the evacuable organic material with a force ranging from 100 to 300 N, determined similarly to DIN EN ISO 5271, and a pressure ranging from 0.01 mbar to 200 mbar is present within the closed envelope.

In the context of the present invention, the composite element has no further layers between the core and the envelope, particularly no covering layers or adhesion-promoting layers.

The composite elements obtained according to the present invention are mechanically stable and provide efficient thermal insulation. Owing to the force fit bond of the envelope to the core, thermal insulation continues to be provided in the event of damage to the envelope. As a result, the composite elements of the present invention are specifically suitable for use as a vacuum insulation panel or a thermal insulation material.

Accordingly, a further aspect of the present invention also provides the method of using a composite element obtained or obtainable by a method as described above, or a composite element as described above, as a vacuum insulation panel.

Accordingly, in a further aspect, the present invention also provides the method of using a composite element obtained or obtainable by a method as described above, or a composite element as described above, as a thermal insulation material.

Further embodiments of the present invention are derivable from the claims and the examples. It will be understood that the aforementioned and hereinbelow elucidated features of the article/method/uses according to the present invention can be used not just in the particular combination recited, but also in other combinations, without departing from the realm of the invention. For instance, the combination of a preferred feature with a particularly preferred feature or of a not further characterized feature with a particularly preferred feature, etc., is also implicitly comprehended even when this combination is not expressly mentioned.

Exemplary embodiments of the present invention, which do not limit the present invention, are recited hereinbelow. More particularly, the present invention also comprehends those embodiments which result from the hereinbelow recited dependency references and hence combinations.

1. A method for manufacturing a composite element comprising a single- or multi-part core and an envelope which are in a force fit combination with each other, at least comprising the steps of:
   (i) providing a single- or multi-part core of an evacuable organic material;
   (ii) at least partly enveloping the core with an envelope to obtain a composite element precursor wherein the envelope surface apposing the core consists of a thermoplastic material;
   (iii) treating the composite element precursor for a period leading to an at least partial softening of the evacuable organic material and of the envelope surface apposing the core.
2. The method according to embodiment 1 wherein the treatment comprises a heat treatment via heating, infrared or ultrasound.
3. The method according to either of embodiments 1 and 2 wherein the treatment as per step (iii) comprises a heat treatment and pressing the envelope against the core.
4. The method according to any one of embodiments 1 to 3 wherein the method after step (ii) and before step (iii) comprises steps (a) and (b):
   (a) evacuating the composite element precursor;
   (b) closing the envelope to obtain an evacuated composite element precursor.
5. The method according to any one of embodiments 1 to 4 wherein the treatment is carried out for a period in the range from 2 seconds to 30 minutes.
6. The method according to any one of embodiments 1 to 5 wherein the single- or multi-part core has a plate-shaped configuration.
7. The method according to any one of embodiments 1 to 6 wherein the evacuable organic material is selected from the group consisting of organic aerogels, organic xerogels and rigid organic foams.
8. The method according to any one of embodiments 1 to 7 wherein the envelope has a multilayered construction.
9. The method according to any one of embodiments 1 to 8 wherein the envelope surface apposing the core consists of a thermoplastic material selected from the group consisting of polyethylene and polypropylene.
10. The method according to any one of embodiments 1 to 9 wherein the envelope is diffusiontight.
11. The method according to any one of claims 1 to 10 wherein the envelope has a DIN 53380 gas permeability of less than 1 $cm^3/(m^2d)$.

12. The method according to any one of claims 1 to 11 wherein the envelope has a DIN 53380 water vapor permeability of less than 1 g/(m²d).
13. The method according to any one of claims 1 to 10 wherein the envelope has a DIN 53380 gas permeability of less than 1 cm³/(m²d) and a DIN 53380 water vapor permeability of less than 1 g/(m²d).
14. A composite element obtained or obtainable by a method according to any one of embodiments 1 to 13.
15. A composite element comprising a single- or multi-part core of an evacuable organic material and at least one closed envelope enclosing the core, wherein the envelope surface apposing the core consists of a thermoplastic material, the envelope surface apposing the core is in direct contact with the evacuable organic material and adheres to the evacuable organic material with a force ranging from 100 to 300 N, determined similarly to DIN EN ISO 5271, and a pressure ranging from 0.01 mbar to 200 mbar is present within the closed envelope.
16. The method of using a composite element obtained or obtainable by a method according to any one of embodiments 1 to 13 or a composite element according to either of embodiments 14 and 15 as a vacuum insulation panel.
17. The method of using a composite element obtained or obtainable by a method according to any one of embodiments 1 to 13 or a composite element according to either of embodiments 14 and 15 as a thermal insulation material.

The examples which follow illustrate the invention and are not in any way to be construed as limiting the subject matter of the present invention.

EXAMPLES

1. Production Example

The following foil was used:

V08621 foil from Hanita Coatings RCA Ltd:

Three plies of metallized polyester film with one LLDPE seal layer 1.1 Example 1: Producing a Xerogel The following compounds were used:

Components:

oligomeric MDI (Lupranat® M50) having an NCO content of 31.5 g per 100 g to ASTM D-5155-96 A, a functionality in the range from 2.8 to 2.9 and a viscosity of 550 mPa·s at 25° C. to DIN 53018 (hereinafter "compound M50").

3,3',5,5'-tetraethyl-4,4'-diaminodiphenylmethane (hereinafter "MDEA")

Catalyst: dimethylpiperazine 56 g of compound M50 were dissolved in 210 g of acetone in a glass beaker at 20° C. under agitation. 8 g of the compound MDEA, 1 g of dimethylpiperazine and 2 g of water were dissolved in 210 g of acetone in a second glass beaker. The two solutions from step (a) were mixed to obtain a clear mixture of low viscosity. The mixture was left to cure for 24 hours at room temperature. Thereafter, the gel was moved from the glass beaker and liquid (acetone) was removed by drying at 20° C. for 7 days.

The xerogel obtained had a compressive strength of 0.202 N/mm² coupled with a density of 117 kg/m³.

Its thermal conductivity was 5.5 mW/m*K at the 3.6*10-4 mbar applied pressure to seal the foil (Hanita V08621).

1.2 Example 2: Producing an Open-cell Rigid Polyurethane Foam

The following compounds were used:

Polyol A: polyether alcohol formed from sucrose, glycerol and propylene oxide, hydroxyl number 490

Polyol B: polyether alcohol formed from propylene glycol and propylene oxide, hydroxyl number 105

Polyol C: polyether alcohol formed from propylene glycol and propylene oxide, hydroxyl number 250

Additive 1: Tegostab® B 8870 silicone stabilizer from Evonik

Additive 2: Ortegol® 501 cell opener from Evonik

Catalyst 1: Polycat® 58 (Air Products)

Catalyst 2: potassium acetate in ethylene glycol (BASF)

Isocyanate: polymer MDI (Lupranat® M70, BASF)

The recited raw materials were used to prepare a polyol component, which was reacted with the isocyanate. The amounts of the starting materials used are found in table 1. Mixing took place in a mix head. The reaction mixture was exported into a lab mold having the side lengths 418*700*455 mm and left to cure therein.

TABLE 1

| employed amounts of starting materials | |
|---|---|
| Component | Parts by weight |
| polyol A | 44.10 |
| polyol B | 44.10 |
| polyol C | 9.15 |
| water | 0.55 |
| stabilizer | 0.90 |
| catalyst 1 | 0.50 |
| catalyst 2 | 0.70 |
| cell opener | 1.80 |
| cyclopentane | 9.50 |
| isocyanate | 194 |
| index | 244 |

Test specimens measuring 19*19*2 cm were sawn out of the rigid foam blocks, packed into a gastight foil (Hanita V08621) and the foil was sealed following evacuation to pressures below 0.1 mbar.

The thermal conductivity was 7.7 mW/m*K at the 3.5 * 10-4 mbar applied pressure to seal the foil (Hanita V08621).

1.3 Example 3: Producing an Aerogel

The following compounds were used:

Components:

Oligomeric MDI (Lupranat® M200) having an NCO content of 30.9 g per 100 g to ASTM D-5155-96 A, a functionality in the region of three and a viscosity of 2100 mPa·s at 25° C. to DIN 53018 (hereinafter "compound M200").

3,3',5,5'-Tetramethyl-4,4'-diaminodiphenylmethane (hereinafter "MDMA")

Catalyst: Dabco K15 (potassium ethylhexanoate dissolved in diethylene glycol (85%))

48 g of compound M200 were dissolved in 210 g of acetone in a glass beaker at 20° C. under agitation. 12 g of the compound MDMA, 2 g of Dabco K15 and 4 g of water were dissolved in 210 g of acetone in a second glass beaker. The two solutions from step (a) were mixed to obtain a clear mixture of low viscosity. The mixture was left to cure at room temperature for 24 hours. The gel monolith was removed from the glass beaker and transferred into a 250 ml autoclave, which was subsequently closed. The monolith was dried in a $CO_2$ stream for 24 h. The pressure (in the drying system) was between 115-120 bar; the temperature was 40° C. At the end, the pressure in the system was let down to atmospheric at a temperature of 40° C. in a controlled manner in the course of about 45 minutes. The autoclave was opened and the dried monolith was removed. The thermal conductivity of the aerogel thus obtained was 17.5 mW/m*K at 10° C.

2. Tests of Core/Foil Adherence

The sealing/bonding of the foil (Hanita V08621) to the core was effected using a press after heat treatment of the foil. The press parameters were 125° C. hot platen temperature, 3 minutes press time and 2 bar molding pressure.

The sealed samples were stored under standard conditions (23° C., 50% rh) for 24 h.

A pull-off test on the foil sealed onto the core was carried out in accordance with DIN EN ISO 527-1 and gave a maximum pull-off force of:

Example 1: 130 N
Example 2: 249 N

The example shows that the adherence between the core material and the seal layer has the effect that a force has to be applied in order to destabilize this composite.

Accordingly, the composite elements of the present invention exhibit improved stability.

We claim:

1. A method for manufacturing a composite element comprising a single- or multi-part core and an envelope which are in a force fit combination with each other, the method comprising:
   at least partly enveloping a single- or multi-part core of an evacuable organic material with an envelope to obtain a composite element precursor, wherein an envelope surface apposing the core comprises a thermoplastic material;
   treating the composite element precursor for a period leading to an at least partial softening of the evacuable organic material and of the envelope surface apposing the core.

2. The method according to claim 1, wherein the treating comprises a heat treatment via heating, infrared or ultrasound.

3. The method according to claim 1, wherein the treating comprises a heat treatment and pressing the envelope against the core.

4. The method according to claim 1, further comprising, before the treating:
   (a) evacuating the composite element precursor;
   (b) closing the envelope to obtain an evacuated composite element precursor.

5. The method according to claim 1, wherein the treating is carried out for a period in the range from 2 seconds to 30 minutes.

6. The method according to claim 1, wherein the single- or multi-part core has a plate-shaped configuration.

7. The method according to claim 1, wherein the evacuable organic material is selected from the group consisting of an organic aerogel, an organic xerogel and a rigid organic foam.

8. The method according to claim 1, wherein the envelope has a multilayered construction.

9. The method according to claim 1, wherein the envelope surface apposing the core comprises a thermoplastic material selected from the group consisting of a polyethylene and a polypropylene.

10. The method according to claim 1, wherein the envelope is diffusiontight.

11. The method according to claim 1, wherein the envelope has a DIN 53380 gas permeability of less than 1 $cm^3/(m^2d)$.

12. The method according to claim 1, wherein the envelope has a DIN 53380 water vapor permeability of less than 1 $g/(m^2d)$.

13. A composite element obtained by the method of claim 1.

14. A vacuum insulation panel, comprising a composite element manufactured by the method of claim 1.

15. A thermal insulation material, comprising a composite element manufactured by the method of claim 1.

* * * * *